Sept. 12, 1933.  F. W. SCHRAMM  1,926,181
CURRENT GENERATING DEVICE
Filed Sept. 8, 1932

INVENTOR
F. W. Schramm
BY Ralph W. Wolf.
ATTORNEY

Patented Sept. 12, 1933

1,926,181

UNITED STATES PATENT OFFICE 1,926,181

CURRENT GENERATING DEVICE

Fred W. Schramm, East Orange, N. J., assignor to American Telephone and Telegraph Company, a corporation of New York Application September 8, 1932. Serial No. 632,226

1 Claim. (Cl. 175—363)

This invention relates to electrical circuits and more particularly to a device for deriving either a pulsating direct current or an alternating current from a source of direct current. More specifically, this invention relates to the application of a gas-filled tube and associated equipment for the production of the aforementioned types of power.

In the telephone art, small amounts of pulsating direct current or alternating current power are required for signaling or other purposes in locations having only direct current power available. The method used at present to supply such aforementioned types of power under such circumstances is to provide a motor driven generator, inverter or interrupter. These devices are relatively expensive, require considerable maintenance because of moving parts and are not adaptable to changes in frequency. One of the objects of this invention is to devise a means of producing such power as has been herein mentioned through the use of a gas-filled tube of the proper design containing some suitable gas such as argon or helium at the correct pressure. Such a device involves no mechanical motion or moving contacts, provides a simple adjustment of the frequency of the output power, requires a relatively small amount of energy for control and the only maintenance required is the replacement of the tube.

Figure 1:
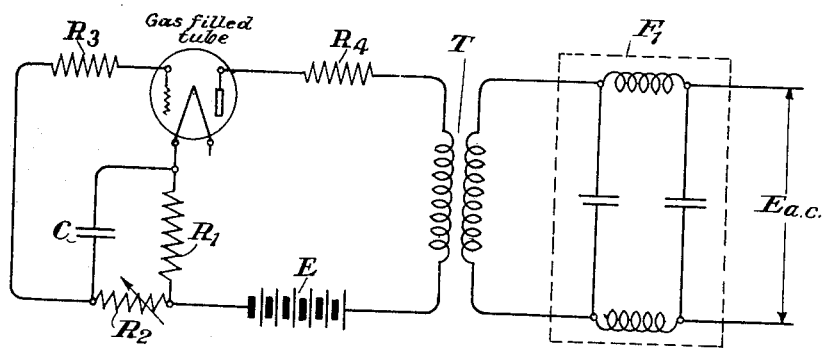
Figure 2:
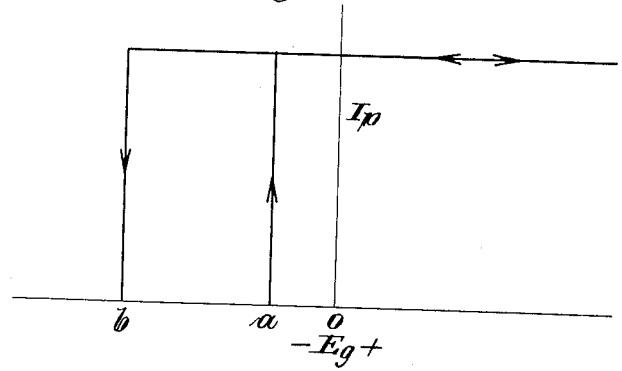
Figure 3:
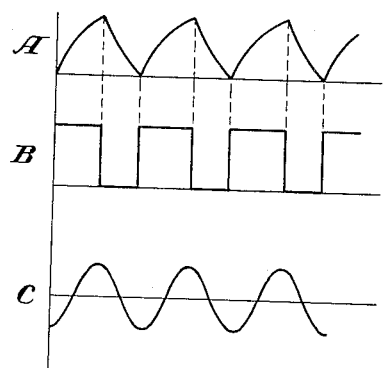

The invention may be more fully understood from the following description, together with the accompanying drawing in the Figures 1, 2 and 3 of which the invention is illustrated.

Fig. 1 is a circuit diagram embodying a preferred form of the invention. Figs. 2 and 3 illustrate certain principles of operation of the invention.

The equipment employed in this invention consists essentially of a gas-filled tube, a source of unidirectional potential for the anode of the tube, a condenser and associated resistances, and either a resistance or a transformer in the anode circuit. The resistance is used in the anode circuit if the output desired is pulsating direct current whereas the transformer is used if it is desired to obtain an alternating current. Hereinafter the use of a resistance in the anode circuit will not be considered but it is understood that it is within the spirit and scope of this invention to employ such a resistance if a pulsating direct current output is desired.

It is one of the characteristics of a gas-filled tube that it may be so constructed that the grid will regain control of the anode current when a reasonable negative potential is applied to the same. The grid voltage-plate current characteristic curve of such type of tube is illustrated by Fig. 2 of the drawing. Assuming the tube to be unoperated and hence to have no anode current flowing, a negative potential of a value larger than $Oa$ will allow no anode current to flow. However, when the negative bias applied to the grid falls to a value $Oa$ then the tube will operate and plate current will flow. For any negative value of grid bias less than $Oa$ and for any positive value of grid bias, the tube will remain operated and the plate current will remain unchanged. Also if the value of the grid bias is increased in the negative direction, the tube will remain operated until the value $Ob$ is reached, at which time the tube will release and plate current will again cease to flow. Now the negative grid bias must be reduced to the value $Oa$ or lower before the tube will again operate.

Consideration will now be given to the circuit diagram shown in Fig. 1. The gas-filled tube is of such a design that when the circuit composed of condenser C and resistances $R_2$ and $R_1$ supplies no potential to the grid, or a grid potential less negative than $Oa$, the tube operates. $R_3$ is a resistance included in the grid circuit of the tube to prevent a rapid discharge of the condenser circuit through the grid to cathode circuit within the tube. Battery E supplies the anode potential to the tube through transformer T and the protective resistance $R_4$.

Condenser C and resistances $R_1$ and $R_2$ are so chosen that when the tube operates and discharges the flow of the anode current through resistance $R_1$ will charge the condenser C through resistance $R_2$ to such a potential that this potential when applied to the grid of the tube through resistance $R_3$, will cause the tube to release. In other words the grid potential will be more negative than $Ob$. The anode current of the tube is then interrupted. The charge on the condenser will leak off through resistances $R_2$ and $R_1$. When the potential difference between the two plates of the condenser falls below the value $Oa$, the tube will again operate and anode current will flow through resistance $R_1$. This will result in the charging of condenser C and the repetition of the procedure described above.

The charge and discharge time of condenser C may be varied by adjusting the value of resistance $R_2$. By this method the frequency of the output may be varied. Curve A of Fig. 3 is the charge and discharge curve of the condenser C. The resulting potential which appears across the primary of transformer T is a pulsating unidirectional potential shown by curve B of Fig. 3. Filter F₁ is an electrical filter tuned to the frequency of the output of the gas-filled tube circuit. This filter tends to produce an output potential E_ac which has approximately sine wave form similar to that shown in curve C of Fig. 3.

While this invention has been disclosed as embodied in a specific form, it will be understood that it is capable of embodiment in other and different forms without departing from the spirit and scope of the invention.

What is claimed is:

A current generating device comprising a gas-filled discharge tube, a cathode-anode circuit for said tube, a grid circuit for said tube, resistances in said grid and cathode-anode circuits, a condenser included in said grid circuit and so connected to said resistances that the discharge of said tube will cause the charge on said condenser to so change that said tube will cease to discharge and the stopping of the discharge will so change the charge on the condenser that said tube will discharge again whereby a pulsating direct current will flow in the cathode-anode circuit of said tube, a circuit connected by a transformer to said cathode-anode circuit, and a filter in said last mentioned circuit tuned to the frequency of said pulsating current whereby it will be converted into an alternating current.

FRED W. SCHRAMM.